United States Patent
Kagawa et al.

(10) Patent No.: US 11,514,388 B2
(45) Date of Patent: Nov. 29, 2022

(54) LOGISTICS SYSTEM

(71) Applicant: Hitachi Industrial Equipment Systems Co., Ltd., Tokyo (JP)

(72) Inventors: Hiroyuki Kagawa, Tokyo (JP); Hiroshi Sasaki, Tokyo (JP); Toyotaka Yuasa, Tokyo (JP); Kenichi Souma, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 998 days.

(21) Appl. No.: 15/545,740

(22) PCT Filed: Feb. 5, 2016

(86) PCT No.: PCT/JP2016/053548
§ 371 (c)(1),
(2) Date: Jul. 24, 2017

(87) PCT Pub. No.: WO2016/152278
PCT Pub. Date: Sep. 29, 2016

(65) Prior Publication Data
US 2018/0018626 A1      Jan. 18, 2018

(30) Foreign Application Priority Data
Mar. 25, 2015    (JP) .............................. JP2015-062310

(51) Int. Cl.
G06Q 10/08       (2012.01)
G06K 19/06       (2006.01)
G06K 7/14        (2006.01)

(52) U.S. Cl.
CPC ....... *G06Q 10/0832* (2013.01); *G06K 7/1413* (2013.01); *G06K 7/1417* (2013.01);
(Continued)

(58) Field of Classification Search
CPC ........... G06K 7/1417; G06K 19/06037; G06K 7/1413; G06K 19/0614; G06Q 10/0833;
(Continued)

(56) References Cited

U.S. PATENT DOCUMENTS

| | | | | |
|---|---|---|---|---|
| 2003/0047477 A1* | 3/2003 | Nygardh | ................ | G01K 11/12 |
| | | | | 374/E11.018 |
| 2003/0094494 A1* | 5/2003 | Blanford | .................. | G06K 7/14 |
| | | | | 235/462.07 |

(Continued)

FOREIGN PATENT DOCUMENTS

| | | |
|---|---|---|
| JP | 2002-37420 A | 2/2002 |
| JP | 2002037420 A * | 2/2002 |

(Continued)

OTHER PUBLICATIONS

Mike Fairley, "How to Monitor Time/Temperature in the Food and Beverage Supply Chain", Apr. 1, 2008; packagingstrategies.com, 6 pages. (Year: 2008).*

(Continued)

*Primary Examiner* — Shannon S Campbell
*Assistant Examiner* — Freda A Nelson
(74) *Attorney, Agent, or Firm* — Crowell & Moring LLP

(57) ABSTRACT

The purpose of the present invention is to provide a system which, in a product delivery procedure, monitors and manages, more simply and reliably, a deviation from a managed temperature during shipment. To solve the problem, provided is a logistics system, comprising: an information reading and transmitting device which reads an information code which is provided on a product and transmits data which is included in the information code; a server which accumulates, via a communications network, the data which is transmitted from the information reading and transmitting device; and a terminal device which refers to the data which (Continued)

is accumulated in the server via the communications network. The information code is formed from a pattern which changes with an occurrence of a deviation from a specified temperature. The system employs the information code.

11 Claims, 5 Drawing Sheets

(52) U.S. Cl.
CPC ... *G06K 19/0614* (2013.01); *G06K 19/06046* (2013.01); *G06Q 10/0833* (2013.01); *G06Q 10/0838* (2013.01)

(58) Field of Classification Search
CPC ............ G06Q 10/0832; G06Q 10/0838; B42D 25/47; G01D 9/005; G01N 31/229; B65D 2203/02
USPC ........... 705/332, 317; 235/375, 374; 283/67; 116/206
See application file for complete search history.

(56) References Cited

U.S. PATENT DOCUMENTS

| | | | | |
|---|---|---|---|---|
| 2008/0140432 | A1* | 6/2008 | Fenn | G06Q 30/018 705/317 |
| 2009/0166438 | A1* | 7/2009 | Sanchez | G06Q 10/0875 235/494 |
| 2009/0230182 | A1 | 9/2009 | Nemet et al. | |
| 2009/0302102 | A1 | 12/2009 | Nemet et al. | |
| 2010/0219235 | A1* | 9/2010 | Nemet | G06Q 10/08 235/375 |
| 2010/0264640 | A1* | 10/2010 | Lane | B42D 25/47 283/67 |
| 2011/0084128 | A1* | 4/2011 | Haarer | G01K 3/04 235/375 |
| 2012/0174853 | A1* | 7/2012 | Wilson | G01D 9/005 116/206 |
| 2012/0175412 | A1* | 7/2012 | Grabiner | G06Q 30/0623 235/375 |
| 2016/0194132 | A1* | 7/2016 | Davidson | G01K 3/04 206/459.1 |

FOREIGN PATENT DOCUMENTS

| | | | |
|---|---|---|---|
| JP | 2002-87542 | A | 3/2002 |
| JP | 2002087542 | A * | 3/2002 |
| JP | 2006-65374 | A | 3/2006 |
| JP | 2011-526379 | A | 10/2011 |
| JP | 2014-211883 | A | 11/2014 |
| JP | 2014235395 | A * | 12/2014 |

OTHER PUBLICATIONS

Anton Steeman, "Food Safety—Temperature Sensitive Labels Destroy Barcodes", Jan. 13, 2014; packagingdigest.com; 3 pages (Year: 2014).*

"New Wireless Temperature Monitoring Label Introduced", Jan. 30, 2014, Packaging digest.com, 2 pages (Year: 2014).*

Timestrip Blood Temp 10-Nonreversible Temperature Indicator, Nov. 6, 2014, 6 pages (Year: 2014).*

"DryPak Industries—Temperature Indicating Labels Irreversible Styles", Wayback Machine; Sep. 16, 2014; 10 pages (Year: 2014).*

International Search Report (PCT/ISA/210) issued in PCT Application No. PCT/JP2016/053548 dated Mar. 8, 2016 with English translation (3 pages).

Japanese-language Written Opinion (PCT/ISA/237) issued in PCT Application No. PCT/JP2016/053548 dated Mar. 8, 2016 (4 pages).

* cited by examiner

LOGISTICS SYSTEM

TECHNICAL FIELD

The present invention relates to a logistics system with a temperature management scheme.

BACKGROUND ART

Lately, there has been an increasing amount of distribution of packages that must be delivered in a cold or frozen condition, such as packages of medical products and foods. During the distribution of these packages that need to be kept in a cold or frozen state, there is a possibility that the packages are exposed to a high temperature with their temperature deviating from a refrigerant or freezing temperature, for instance, when they are handed over from a manufacture to a carrier, when they are handed over from the carrier to another carrier, or when they are handed over from a final carrier to a consumer, or because of failure of a refrigeration/freezing facility. If a package is long exposed to a high temperature, it is of concern that products or articles contained in the package are subject to change in properties and their quality degrades. Hence, there is a need for a system that monitors and manages for a package that needs to be kept in a cold or frozen state as to whether the package has been delivered, while maintained at a proper temperature during its distribution.

To address a problem as noted above, a delivery label and a delivery/distribution system for delivery of commercial products requiring cold transportation, such as foods and medical products, are described in Japanese Unexamined Patent Application Publication No. 2006-65374 (Patent Literature 1) and Japanese Unexamined Patent Application Publication (Translation of PCT Application) No. 2011-526379 (Patent Literature 2).

In Patent Literature 1, a delivery/distribution system is described that is provided with an element including a shaded region portion, a temperature managing medium, and machine-readable information A which are layered in order one on top of the other over a base material and described information B. The system at least includes data acquisition means that reads a sheet which is delivered with a delivery and the information B and transmitting means that transmits the information B acquired by the data acquisition means to the source of the delivery. The temperature managing medium changes from a colored state to a colorless state when its temperature goes beyond a predetermined temperature range and the information A is visually readable before the change in color and becomes hard to read visually after the change in color. The system further includes a computer that includes receiving means that receives the information B from the transmitting means and broadcasting means that outputs a redelivery instruction regarding the delivery depending on the information B received by the receiving means.

In Patent Literature 2, there is disclosed a quality management system including a quality indicator with a first barcode which becomes unreadable by becoming colored when temperature goes beyond a threshold of temperature and a second barcode which becomes machine-readable at the same time.

CITATION LIST

Patent Literature

Patent Literature 1: Japanese Unexamined Patent Application Publication No. 2006-65374

Patent Literature 2: Japanese Unexamined Patent Application Publication (Translation of PCT Application) No. 2011-526379

SUMMARY OF INVENTION

Technical Problem

In Patent Literature 1, there is a description that the temperature managing medium discolors when its temperature deviates from a predetermined temperature range, which causes the information A to overlap with the shaded region portion and makes it unreadable. However, in the method of Patent Literature 1, when the information A has become unreadable, it cannot be distinguished whether the information A became unreadable or there was failure to read the information A. It is also disclosed that, if the information A has become unreadable, a deliverer is to take an image of a merchandize item label (information B) with a cellular phone and transmit the image to a computer to arrange for redelivery. Two types of information reading devices, i.e., a barcode reader and a cellular phone to take an image are required and the system becomes complex. In addition, if a carrier fails to transmit the information B, even though the information A is unreadable, determination cannot be made as to which phase of distribution that deviation from the temperature range has occurred. Moreover, even after the temperature managing medium discolors, separating the information A from the shaded region portion makes it possible to read the information A and there is a possibility that the information A is transmitted even when temperature has exceeded the temperature range.

In Patent Literature 2, there is a description that the first barcode becoming unreadable and the second barcode becoming readable occur at the same time. In this indicator, switching between readable and unreadable states is made by natural spreading of a coloring agent. There is a time lag in response to temperature change and there is a possibility that a temporary excess beyond the threshold of temperature, even when occurring, is not reflected. Also, it is difficult to switch between the readable and unreadable states of two barcodes at the same time. In addition, because the barcodes themselves do not change, even when temperature has exceeded the threshold of temperature, separating the barcodes from an element capable of coloring makes it possible to read the barcodes, and resistance to counterfeiting is low.

An object of the present invention is to provide a system that, in a process of delivery of products, monitors and manages for deviation from a managed temperature during distribution in a simpler and reliable manner.

Solution to Problem

To solve the foregoing problem, for example, configurations described in claims are adopted. The present application encompasses a plurality of means for solving the foregoing problem. By way of example, a logistics system is configured as follows: the logistics system includes an information reading and transmitting device that reads an information code attached on a product and transmits data contained in the information code, a server that accumulates data transmitted from the information reading and transmitting device over a communication network, and a terminal device that refers to the accumulated data from the server over the communication network; the information code includes a pattern that will convert when its temperature has deviated from a specified temperature; and the logistics system uses the information code.

Advantageous Effects of Invention

According to the present invention, by taking advantage of the fact that an information code itself will covert, it is enabled to monitor and manage for deviation from a managed temperature during distribution in a simpler and reliable manner. Problems, configurations, and advantageous effects other than described above will be apparent from the following description of embodiments.

DESCRIPTION OF EMBODIMENTS

In the following, embodiments will be described with the aid of the drawings.

First Embodiment

Figure 1:
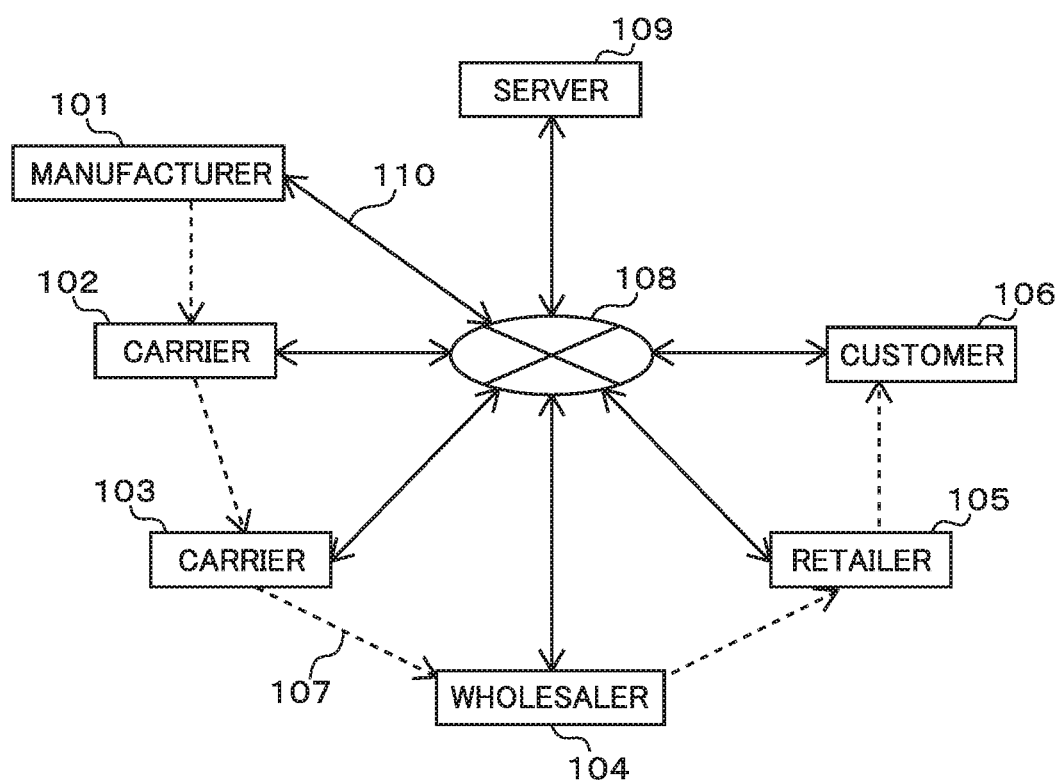
FIG. 1 is a general schematic diagram depicting an overall aspect of a logistics system in a first embodiment.

FIG. 1 is a general schematic diagram depicting an overall aspect of a logistics system of the present embodiment. In FIG. 1, a manufacturer 101 of a product which requires temperature management delivers and sales the product to a carrier 102. Likewise, the carrier 102 delivers and sales the product to a carrier 103, the carrier 103 does the same to a wholesaler 104, the wholesaler 104 does the same to a retailer 105, and the retailer 105 does the same to a customer 106 who is a final recipient.

There may be a single carrier or a plurality of carriers. Without intervention of the wholesaler 104 and the retailer 105, the product may be delivered from the carrier 102 or 103 directly to the retailer 105 or the customer 106. Dashed arrows indicate a flow 107 of the product. Also, solid arrows indicate a flow 110 of an information code.

Figure 2:
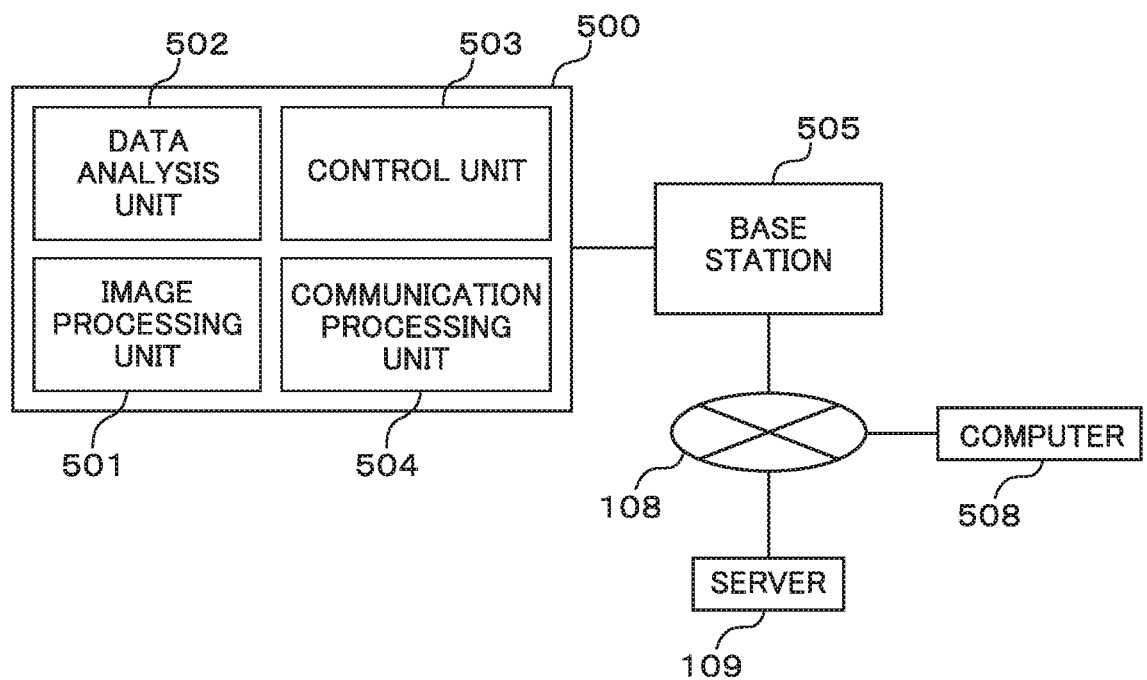
FIG. 2 is a basic configuration diagram of devices which are used in the logistics system in the first embodiment.

Also, FIG. 2 depicts a basic configuration of devices which are used in the logistics system of the present embodiment. In FIG. 2, an information reading and transmitting device 500 is primarily comprised of an image processing unit 501 that processes an image which has been read, a data analysis unit 502 that analyzes data relevant to the image, a control unit 503 that controls the device as a whole, and a communication processing unit 504 that transmits the data. The read data transmitted by the communication processing unit is sent via a base station 505 to a server 109 over a network 108. The data which has been sent to and accumulated on the server can be browsed by a computer 508 which is a terminal device over the network 108.

In FIG. 1, when handing over a product to the carrier 102, the manufacturer 101 reads an information code by the information reading and transmitting device and transmits data thus read to the server 109 over the network 108. When the carrier 102 receives the product and when it hands over the product to the carrier 103, the carrier 102 likewise reads the information code and transmits data thus read to the server 109. When the carrier 103 receives the product and when it hands over the product to the wholesaler 104, the carrier 103 likewise reads the information code and transmits the data to the server 109. When the wholesaler 104 receives the product and when it hands over the product to the retailer 105, the wholesaler 104 likewise reads the information code and transmits the data to the server 109. Also, when the retailer 105 receives the product and when it sells the product to a customer, the retailer 105 likewise reads the information code and transmits the data to the server 109. Also, when the customer 106 receives the product, the customer 106 reads the information code and transmits the data to the server 109. And now, depending on the product type, it is omissible that the customer 106 reads the information and transmits the data.

By browsing the data contained in the information code transmitted to and accumulated on the server 109 directly or via a terminal device such as a computer, the manufacturer 101, carriers 102, 103, wholesaler 104, retailer 105, and customer 106 can check delivery status and decide whether or not deviation from a managed temperature has occurred. Or they cause the terminal device such as a computer to automatically process the data on the server 109 and decide whether or not deviation from a managed temperature has occurred. When receiving the product, the carriers 102, 103, wholesaler 104, retailer 105, and customer 106 compare data that has been read upon receipt with the data accumulated on the server. If there is a discrepancy between both data, they will decide that the product's temperature has deviated from the managed temperature and can reject its receipt and ask for redelivery.

For use in the present embodiment, an information code is adopted in which its pattern or color will convert irreversibly when the product's temperature has deviated from the managed temperature. The pattern or color after changing may be readable or unreadable by the information reading and transmitting device.

Figure 3:
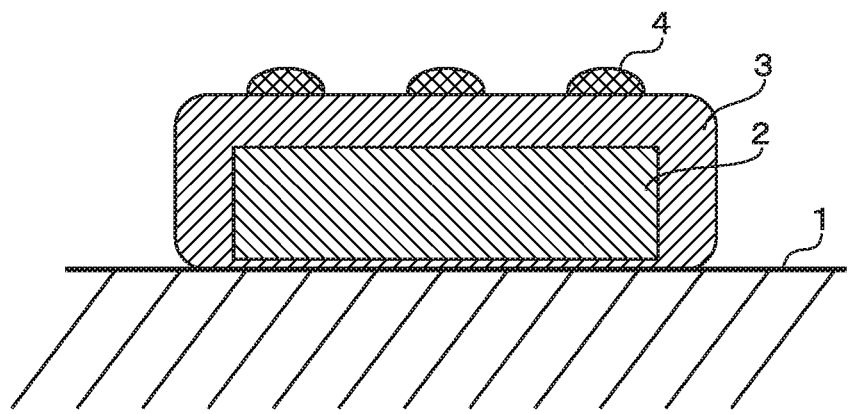
FIG. 3 is a cross-sectional diagram of a thermochromic marking element in which color conversion takes place by temperature deviation.

An element whose pattern or color is converted by temperature deviation is described below. FIG. 3 is a cross-sectional diagram of a thermochromic marking element in which color conversion takes place by temperature deviation. In FIG. 3, reference numeral 1 is a base material; 2 is a developer layer; 3 is a barrier layer; and 4 is a color former layer. Here, the color former is a medical agent that is colorless or light-colored when in contact with a product such as a medical product or a frozen food and forms a color by contacting with an acid or basic chemical. The developer is a colorless or light-colored medical agent having acidity or basicity. The barrier layer is of a material that fuses or softens when its temperature becomes equal to or above a predetermined temperature. As depicted in FIG. 3, the developer layer 2 and the color former layer 4 are isolated by the barrier layer 3. When the temperature of the barrier layer 3 becomes equal to or above the predetermined temperature, the barrier layer 3 fuses or softens, so that the developer and the color former will contact with each other and the color former will form a color.

And now, in FIG. 3, the barrier layer 3 is formed over the developer layer 2 and the color former layer 4 is further formed on top of the barrier layer 3; however, the barrier layer 3 may be formed over the color former layer 4 and the developer layer 2 may be formed on top of the barrier layer 3. That is, it is only required that the developer layer 2 and the color former layer 4 are isolated by the barrier layer 3, and their positional order is of no matter.

Also, it can be implemented that pattern conversion takes place, as the color of a particular pattern converts; for example, it can be implemented so that pattern conversion takes place, as characters become invisible, when the characters' color that will convert becomes the same color as the ground color.

If the thermochromic marking element mentioned above, as its color converts in consequence of temperature rise, not only forms a color, also can form a color in the form of a string of characters, a string of numbers, a graphic, a barcode, a two-dimensional code, etc., it is also possible to manage information such as the number of a factory and the number of a line where the commercial product was manufactured, in addition to managing for temperature rise. In that case, a method of printing using a liquid in which a color former dissolved as ink is preferable; a typical one is an inkjet printer. As an inkjet printer for use for this purpose, a charge control type inkjet printer is preferable that is capable of printing on even a product that is not planar, such as a product having a large surface asperity or a cylindrical shape.

A method of creating a thermochromic marking element with a charge control type inkjet printer is to form the developer layer on an objective product and cover the developer layer with the barrier layer, and, subsequently, to form the color former layer using the charge control type inkjet printer. Alternatively, the element is created by forming the color former layer using the charge control type inkjet and covering the color former layer with the barrier layer, and, consequently, by forming the developer layer.

Figure 4:
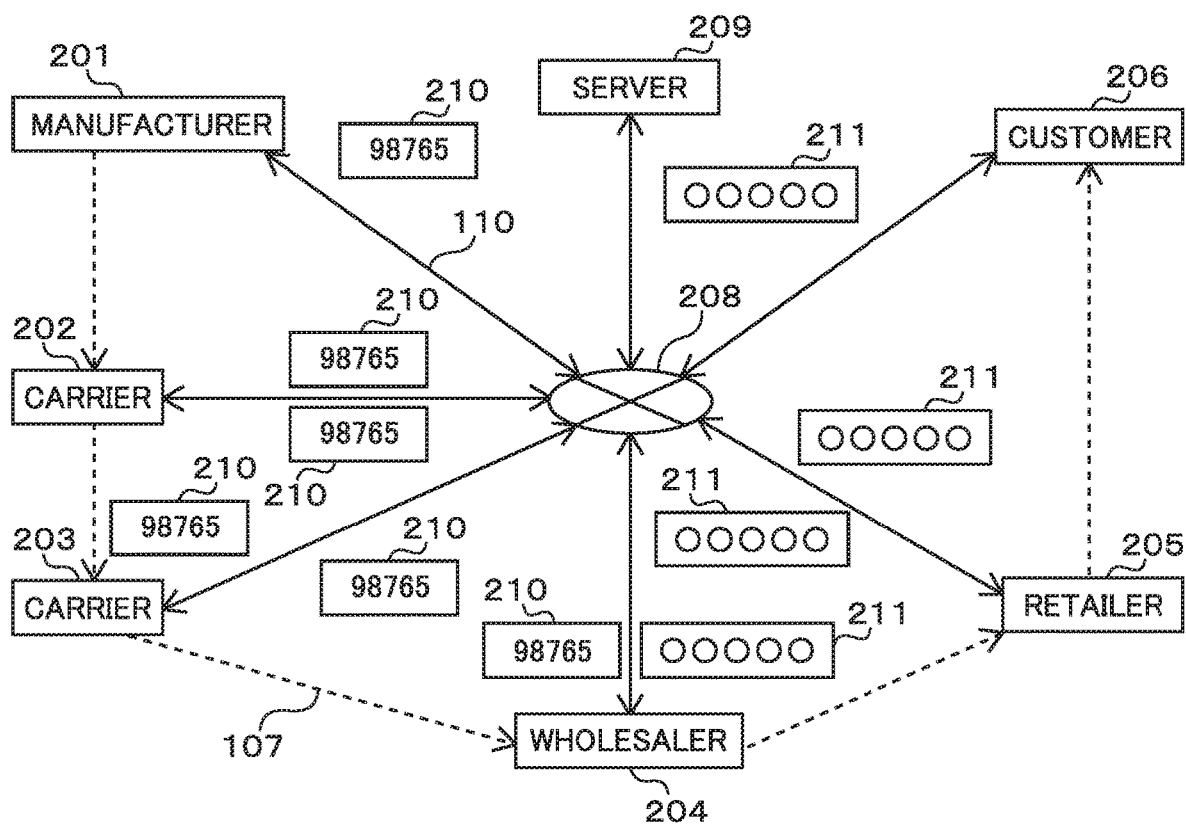
FIG. 4 is a general schematic diagram depicting the logistics system in the first embodiment.

FIG. 4 is a general schematic diagram depicting how monitoring for a product and detecting that its temperature is managed are implemented in the logistics system of the present embodiment. That is, the logistics system of the present embodiment implements management of the temperature of a product by managing, as an information code, a history of the temperature of the product through distribution routes and checking the information code pattern at given timing.

In FIG. 4, the manufacturer 201 of a product, when handing over the product to a carrier 202, reads an information code 210 attached on the product by the information reading and transmitting device and transmits it to a server 209 over a network 208. In the present embodiment, one example of the information code attached on the product is assumed to be [98765]. When the carrier 202 receives the product from the manufacturer and when it hands over the product to a carrier 203, the carrier 202 likewise reads the information code 210 and transmits it to the server 209. Also, when the carrier 203 receives the product from the carrier 202 and when it hands over the product to a wholesaler 204, the carrier 203 likewise reads the information code 210 and transmits it to the server 209. When the wholesaler 204 receives the product from the carrier 203, the wholesaler 204 likewise reads the information code 210 and transmits it to the server 209.

Here, if the product's temperature has run out of a managed temperature range during a period when the product is placed under management of the wholesaler 204 after the wholesaler 204 receives the product from the carrier 203 until it hands over the product to a retailer 205, the pattern of the information code 210 will convert. In the present embodiment, one example of an information code 211 whose pattern has converted is assumed to be [00000]. When handing over the product to the retailer, the wholesaler 204 reads the information code 211 of [00000] by the information reading and transmitting device and transmits it to the server 209 over the network 208. When the retailer 205 receives the product from the wholesaler 204 and when it hands over the product to a customer 206, the retailer 205 likewise reads the information code 211 and transmits it to the server 209. When the customer 206 receives the product from the retailer 205, the customer 206 likewise reads the information code 211 and transmits it to the server 209.

The manufacturer 201 refers to the information code transmitted to the server 209 directly or via a terminal device such as a computer and compares the information code 210 of [98765] and the information code 211 of [00000]; thereby, the manufacturer 201 can decide that temperature deviation of the product occurred after the wholesaler 204 receives the product until it hands over the product to the retailer 205. Information code discrepancy in every phase of distribution may be visually judged by a person in charge on the display screen of a terminal device such as a computer or information code may be judged automatically by an image recognition function.

In addition, when the retailer 205 receives the product from the wholesaler 204, the retailer 205 can learn that temperature deviation occurred before the receipt by confirming that the information code 211 of [00000] on the receipt from the wholesaler 204 differs from the information code of [98765] acquired beforehand by the manufacturer 201 or the carriers 202, 203 on the information reading and transmitting device or on a computer connecting to that device.

When the customer 206 receives the product from the retailer 205, the customer 206 can likewise learn that temperature deviation occurred before the receipt by confirming that the information code 211 of [00000] on the receipt from the retailer 205 differs from the information code of [98765] acquired beforehand by the manufacturer 201 or the carriers 202, 203 on the information reading and transmitting device or on a terminal device such as a computer connecting to that device.

By providing the logistics system that manages, as an information code, a history of the temperature of a product through distribution routes and checks the information code pattern at given timing, as noted above, it is enabled to monitor and manage for deviation from a managed temperature during distribution in a simpler and reliable manner.

In addition, high resistance to counterfeiting is provided by conversion of an information code itself. That is, an information code whose pattern or color converts with change in its temperature is used in the logistics system, thereby providing high resistance to counterfeiting, since the information code itself converts.

And now, examples of the information reading and transmitting device in the present embodiment include a cellular phone equipped with image capturing and transmitting functions, a smart phone, a barcode reader equipped with a communication function, a scanner equipped with a communication function, etc. Additionally, devices to read the information code 210 and the information code 211 may be identical or different. In addition, in the present embodiment, the description assumes that an information code is a barcode; however, an information code may be a string of characters, a string of numbers, a graphic, a two-dimensional code, etc.

As described above, the present embodiment is a logistics system configured as follows: the logistics system includes an information reading and transmitting device that reads an information code attached on a product and transmits data contained in the information code, a server that accumulates data transmitted from the information reading and transmitting device over a communication network, and a terminal device that refers to the accumulated data from the server over the communication network; the information code includes a pattern that will convert when its temperature has deviated from a specified temperature; and the logistics system uses the information code.

In addition, the above logistics system uses an information code whose pattern that will convert when its temperature has deviated from a specified temperature, in which the pattern is readable by the information reading and transmitting device.

The above logistics system is such that temperature deviation of a product is judged by data transmitted from the information reading and transmitting device.

Alternatively, a logistics system is configured as follows: the logistics system includes a first information reading and transmitting device that reads an information code attached on a product and transmits data contained in the information code, a second information reading and transmitting device that is operated by a carrier who receives the product from a manufacturer to read the information code attached on the product and transmit data contained in the information code upon the product receipt and before and after the product delivery, a third information reading and transmitting device that is operated by a customer who receives the product from the carrier to read the information code attached on the product and transmit data contained in the information code upon the product receipt, a server that accumulates data transmitted from the first, second, and third information reading and transmitting devices over a communication network, and a terminal device that refers to the accumulated data from the server over the communication network; an information code includes a pattern that will convert when its temperature has deviated from a specified temperature; and the logistics system uses the information code.

Thus, according to the present embodiment, by taking advantage of the fact that an information code itself will covert, it is enabled to monitor and manage for deviation from a managed temperature during distribution in a simpler and reliable manner.

Second Embodiment

Figure 5:
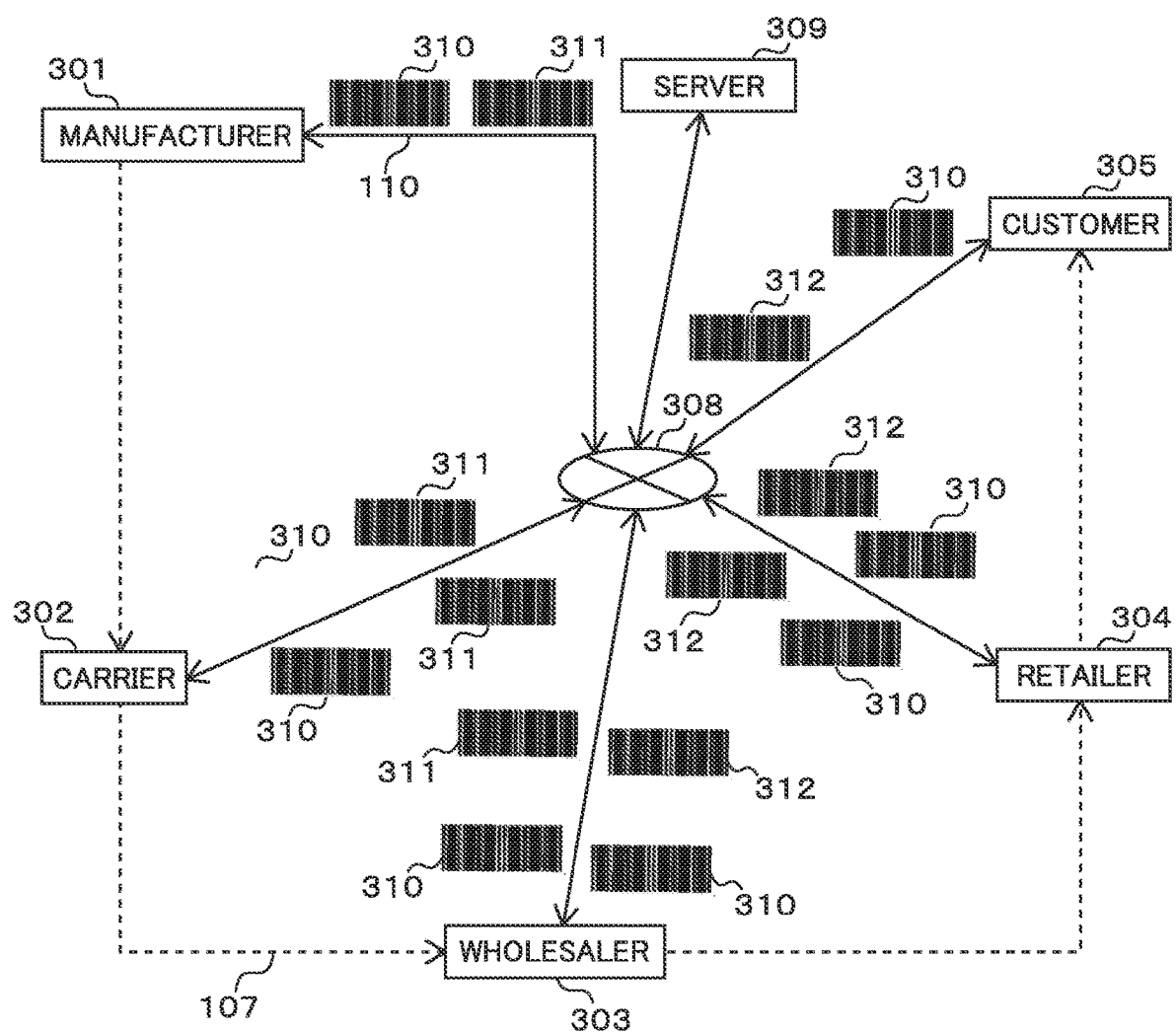
FIG. 5 is a general schematic diagram depicting a logistics system in a second embodiment.

FIG. 5 is a general schematic diagram depicting how monitoring for a product and detecting that its temperature is managed are implemented in the logistics system of the present embodiment.

In FIG. 5, the manufacturer 301 of a product, when handing over the product to a carrier 302, reads two information codes 310 and 311 attached on the product by the information reading and transmitting device and transmits them to a server 309 over a network 308. In the present embodiment, one example of the information codes 310, 311 attached on the product is assumed to be barcodes. Additionally, the information reading and transmitting device is a barcode reader. And now, the information codes 310 and 311 may be identical or different. Here, the information code 310 will not convert even when its temperature deviates from a managed temperature range, whereas the information code 311 is such that its pattern converts to another information code 312 which is readable by a barcode reader when its temperature deviates from the managed temperature range.

When the carrier 302 receives the product from the manufacturer 301 and when it hands over the product to a wholesaler 303, the carrier 302 likewise reads the information codes 310, 311 by the information reading and transmitting device and transmits them to the server 309 over the network 308. When the wholesaler 303 receives the product from the carrier 302, the wholesaler 303 likewise reads the information codes 310, 311 and transmits them to the server 309.

Here, if the product's temperature has run out of a managed temperature range during a period when the product is placed under management of the wholesaler 303 after the wholesaler 303 receives the product from the carrier 302 until it hands over the product to a retailer 304, the pattern of the information code 311 will convert. In the present embodiment, the information code 311 will become an information code 312 whose pattern is readable by the information reading and transmitting device. When handing over the product to the retailer 304, the wholesaler 303 reads the information codes 311 and 312 by the information reading and transmitting device and transmits them to the server 309 over the network 308. Subsequently, when the retailer 304 receives the product from the wholesaler 303 and when it hands over the product to a customer 305, the retailer 304 likewise reads the information codes 311 and 312 and transmits them to the server 309. When receiving the product from the retailer 304, the customer 305 likewise reads the information codes 311 and 312 and transmits them to the server 309.

The manufacturer 301, carrier 302, wholesaler 303, retailer 304, and customer 305 refer to the information codes transmitted to and accumulated on the server 309 directly or via a terminal device such as a computer and compare the information codes 311 and 312; thereby, they can decide that temperature deviation of the product occurred after the wholesaler 303 receives the product until it hands over the product to the retailer 304.

Information code discrepancy in every phase of distribution may be visually judged by a person in charge on the display screen of a terminal device such as a computer or may be judged automatically by the terminal device such as a computer.

In addition, when the retailer 304 receives the product from the wholesaler 303, the retailer 304 can learn that temperature deviation occurred before the receipt by confirming that the information code 312 on the receipt from the wholesaler 303 differs from the information code 311 acquired beforehand by the manufacturer 301 or the carriers 302, 203 on the information reading and transmitting device or with a terminal device such as a computer connecting to that device. When the customer 305 receives the product from the retailer 304, the customer 305 can likewise learn that temperature deviation occurred before the receipt by confirming that the information code 312 on the receipt from the wholesaler 303 differs from the information code 311 acquired beforehand by the manufacturer 301 or the carriers 302, 203 on the information reading and transmitting device or on a terminal device such as a computer connecting to that device.

Additionally, by providing the information code 310 that will not be converted by deviation from the managed temperature, it is possible to indicate that the information code 311 converted to a readable one 312 during distribution of the product, but there was no failure to read the information.

In addition, by embodying all the information codes 310, 311, 312 as merchandise item codes, they can be read by a code reader of the same type. In this case, that the information codes 310, 311, 312 are only required to be readable by the information reading and transmitting device of the same type, but are not necessarily merchandise item codes of the same type; for instance, one may be a JAN code and another may be a two-dimensional code or QR code (a registered trademark). Moreover, when reading the information codes, if the retailer 304 or the customer 305 has detected temperature deviation by the read information codes, the retailer 304 or the customer 305 can reject the receipt of the product and ask for redelivery. In addition, high resistance to counterfeiting is provided by conversion of an information code itself. And now, although the foregoing description assumed that the information codes are two, the information codes may be plural.

As described above, the present embodiment is a logistics system configured as follows: a product is provided with a plurality of information codes, at least one of the information codes has a pattern that will not convert even when its temperature deviates from a specified temperature range and at least another of the information codes has a pattern that will convert when its temperature has deviated from the specified temperature range, and the logistics system uses the plurality of information codes.

In addition, the pattern of an information code that will convert when its temperature has deviated from the specified temperature range is readable by the information reading and transmitting device.

Thus, according to the present embodiment, by providing an information code that will not be converted by deviation from the managed temperature and an information code that will be converted by the deviation, it can be decided whether there was failure to read the information, and it is enabled to monitor and manage for deviation from the managed temperature during distribution in a simpler and reliable manner.

Third Embodiment

Figure 6:
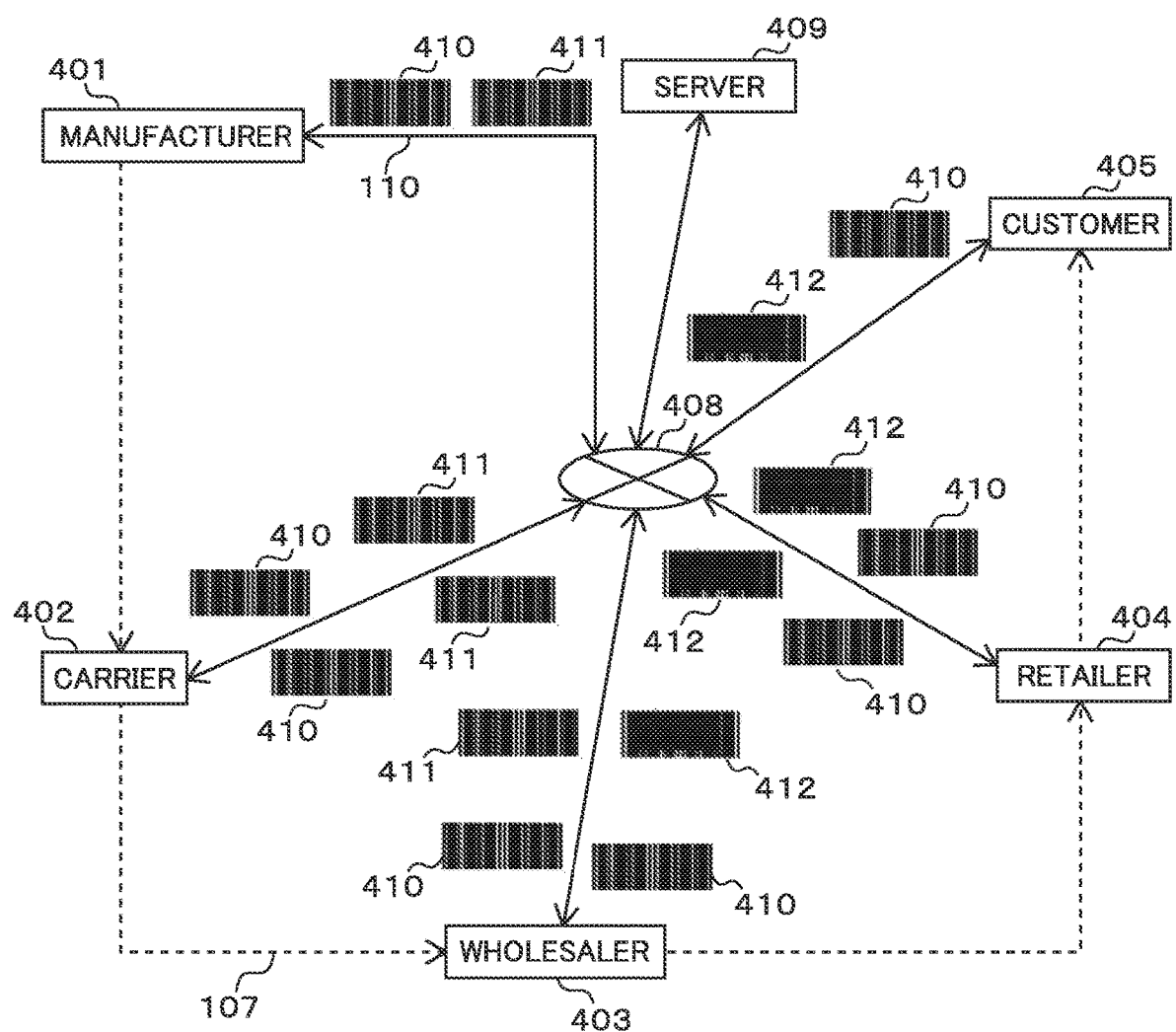
FIG. 6 is a general schematic diagram depicting a logistics system in a third embodiment.

FIG. 6 is a general schematic diagram depicting how monitoring for a product to see that its temperature is managed is implemented in the logistics system of the present embodiment.

In FIG. 6, the manufacturer 401 of a product, when handing over the product to a carrier 402, reads two information codes 410 and 411 attached on the product by the information reading and transmitting device and transmits them to a server 409 over a network 408. In the present embodiment, one example of the information codes 410, 411 attached on the product is assumed to be barcodes. Additionally, the information reading and transmitting device is a barcode reader. And now, the information codes 410 and 411 may be identical or different. Here, the information code 410 will not convert even when its temperature deviates from a managed temperature range, whereas the information code 411 is such that its pattern converts to a pattern unreadable by the barcode reader when its temperature deviates from the managed temperature range.

When the carrier 402 receives the product from the manufacturer and when it hands over the product to a wholesaler 403, the carrier 402 reads the information codes 410, 411 by the information reading and transmitting device and transmits them to the server 409 over the network 408. When the wholesaler 403 receives the product from the carrier 402, the wholesaler 403 likewise reads the information codes 410, 411 and transmits them to the server 409.

Here, if the product's temperature has run out of a managed temperature range during a period when the product is placed under management of the wholesaler 403 after the wholesaler 403 receives the product from the carrier 402 until it hands over the product to a retailer 404, the pattern of the information code 411 will convert to an information code 412 including an unreadable pattern. When the wholesaler 403 hands over the product to the retailer 404, the wholesaler 403 reads only the information code 410 by the information reading and transmitting device because the information code 411 is unreadable by the barcode reader, and transmits it to the server 409 over the network 408. When the retailer 404 receives the product from the wholesaler 403 and when it hands over the product to a customer 405, the retailer 404 likewise reads only the information code 410 and transmits it to the server 409. When receiving the product from the retailer 405, the customer 405 likewise reads only the information code 410 and transmits it to the server 409.

The manufacturer 401 refers to the information codes transmitted to the server 409 directly or via a terminal device such as a computer and can decide, by the number of information codes transmitted in every phase of distribution, that temperature deviation of the product occurred after the wholesaler 403 receives the product until it hands over the product to the retailer 404. Information code discrepancy in every phase of distribution may be visually judged by a person in charge on the display screen of a terminal device such as a computer or may be judged automatically by the terminal device such as a computer.

In addition, when the retailer 404 receives the product from the wholesaler 403, the retailer 304 can learn that temperature deviation occurred before the receipt due to the fact that only the information code 410 can be read by the information reading and transmitting device or by visual judgment. When the customer 405 receives the product from the retailer 404, the customer can likewise learn that temperature deviation occurred before the receipt due to the fact that only the information code 410 can be read by the information reading and transmitting device or by visual judgment.

Additionally, by providing the information code 410 that will not be converted by deviation from the managed temperature, it is possible to indicate that the information code 411 converted to an unreadable one 412 during distribution of the product, but there was no failure to read the information.

In addition, by embodying all the information codes 410, 411 as merchandise item codes, they can be read by a code reader of the same type. In this case, that the information codes 410, 411 are only required to be readable by the information reading and transmitting device of the same type, but are not necessarily merchandise item codes of the same type; for instance, one may be a JAN code and another may be a two-dimensional code or QR code (a registered trademark). Moreover, when reading the information codes, if the retailer 404 or the customer 405 has detected temperature deviation because one of the information codes cannot be read, the retailer 404 or the customer 405 can reject the receipt of the product and ask for redelivery. In addition, high resistance to counterfeiting is provided by conversion of an information code itself.

As described above, the present embodiment is a logistics system configured as follows: a product is provided with a plurality of information codes, at least one of the information codes has a pattern that will not convert even when its temperature deviates from a specified temperature range and at least another of the information codes has a pattern that will convert to a pattern unreadable by the information reading and transmitting device when its temperature has deviated from the specified temperature range, and the logistics system uses the plurality of information codes.

The logistics system is also configured such that temperature deviation of a product is judged by the number of data pieces that the information reading and transmitting device has read from a plurality of information codes.

Thus, according to the present embodiment, by providing an information code that will not be converted by deviation from the managed temperature and an information code that will be converted by the deviation, it can be decided whether there was failure to read the information, and it is enabled to monitor and manage for deviation from the managed temperature during distribution in a simpler and reliable manner.

The present invention is not limited to the described embodiments and various modifications are included therein. Also, the foregoing embodiments are those described in detail to explain the present invention clearly and the invention is not necessarily limited to those including all components described. In addition, a subset of the components of an embodiment can be replaced by components of another embodiment. To the components of an embodiment, components of another embodiment can be added. For a subset of the components of each embodiment, other components can be added to the subset or the subset can be removed or replaced by other components.

LIST OF REFERENCE SIGNS

1 . . . Base material, 2 . . . Developer layer, 3 . . . Barrier layer, 4 . . . Color former layer, 101, 201, 301, 401 . . . Manufacturer, 102, 103, 202, 203, 302, 402 . . . Carrier, 104, 204, 303, 403 . . . Wholesaler, 105, 205, 304, 404 . . . Retailer, 106, 206, 305, 405 . . . Customer, 107 . . . A flow of the product, 110 . . . A flow of an information code, 108, 208, 308, 408 . . . Network, 109, 209, 309, 409 . . . Server, 210, 211, 310, 311, 312, 410, 411, 412 . . . Information code, 500 . . . Information reading and transmitting device, 501 . . . Image processing unit, 502 . . . Data analysis unit, 503 . . . Control unit, 504 . . . Communication processing unit, 505 . . . Base station, 508 . . . Computer

The invention claimed is:

1. A logistics system comprising:
a code reading apparatus configured to read an information code attached to a product that is monitored by the logistics system, and transmit data contained in the information code;
a communication network configured to facilitate communication in the logistics system;
a server programmed to accumulate the data transmitted from the code reading apparatus over the communication network; and
a terminal device configured to communicate with the server over the communication network to obtain the accumulated data,
wherein the product is provided with a plurality of information codes, at least one of the information codes has a pattern that will not convert even when its temperature deviates from a specified temperature range and at least another of the information codes has a pattern that will convert irreversibly with respect to temperature when its temperature has deviated from the specified temperature range, and the logistics system uses the plurality of information codes;
wherein the pattern of the information code that will convert, converts to a pattern unreadable by the code reading apparatus from readable by the code reading apparatus, or converts to a first pattern readable by the code reading apparatus from a second pattern that is different from the first pattern and is readable by the code reading apparatus, when its temperature has deviated from the specified temperature range; and
wherein a temperature deviation of the product is judged by a number of the plurality of information codes that the code reading apparatus has read;
the code reading apparatus reads both the pattern that will not convert even when its temperature deviates from a specified temperature range and the second pattern that will convert to the first pattern when its temperature has deviated from the specified temperature range; and
the terminal device determines the temperature deviation of the product by comparing data transmitted from the code reading apparatus when the product was received, and data accumulated in the server transmitted from the code reading apparatus before receiving the product;
wherein the pattern that will convert is formed by a thermochromic marking element, in which pattern conversion occurs by a color of the pattern becoming a same color as a base material of the thermochromic marking element.

2. The logistics system according to claim 1, wherein the pattern of the information code that will convert when its temperature has deviated from a specified temperature is readable by the information reading and transmitting device and the logistics system uses the information code.

3. The logistics system according to claim 1, wherein the pattern of the information code that will convert when its temperature has deviated from the specified temperature range is a pattern readable by the information reading and transmitting device and the logistics system uses the information code.

4. The logistics system according to claim 1, wherein the temperature deviation of the product is judged by data transmitted from the information reading and transmitting device.

5. The logistics system according to claim 1, wherein the information code is at least one of characters, numbers, a graphic, a barcode, and a two-dimensional code.

6. The logistics system according to claim 1, wherein the plurality of information codes are at least one of characters, numbers, a graphic, a barcode, and a two-dimensional code and are of the same type.

7. The logistics system according to claim 1, wherein the information reading and transmitting device is of one type and reads and transmits the plurality of information codes.

8. The logistics system according to claim 1, wherein, before and after delivery of the product, the information code is read and data contained in the information code is transmitted by the information reading and transmitting device.

9. The logistics system according to claim 1, wherein the server is judged whether or not deviation from a temperature has occurred by comparing a plurality of the data accumulated on the server.

10. A logistics system comprising:
a first code reading apparatus configured to read an information code attached to a product that is monitored by the logistics system, and transmit data contained in the information code;
a second code reading apparatus that is operated by a carrier who receives the product from a manufacturer to read the information code attached to the product and transmit data contained in the information code upon receipt of the product and before and after delivery of the product;

a third code reading apparatus that is operated by a customer who receives the product from the carrier to read the information code attached to the product and transmit data contained in the information code upon receipt of the product;

a communication network configured to facilitate communication in the logistics system;

a server programmed to accumulate data transmitted from the first, second, and third code reading apparatuses over the communication network; and a terminal device configured to communicate with the server over the communication network to obtain the accumulated data, wherein the product is provided with a plurality of information codes, at least one of the information codes has a pattern that will not convert even when its temperature deviates from a specified temperature range and at least another of the information codes has a pattern that will convert to a pattern unreadable by the code reading apparatuses when its temperature has deviated from the specified temperature range;

wherein the pattern of the information code that will convert, converts to a pattern unreadable by the code reading apparatus from readable by the code reading apparatus, or converts to a first pattern readable by the code reading apparatus from a second pattern that is different from the first pattern and is readable by the code reading apparatus, when its temperature has deviated from the specified temperature range; and wherein a temperature deviation of the product is judged by a number of the plurality of information codes that the first, second and third code reading apparatuses have read;

the code reading apparatuses read both the pattern that will not convert even when its temperature deviates from a specified temperature range and the second pattern that will convert to the first pattern when its temperature has deviated from the specified temperature range; and the terminal device determines a temperature deviation of the product by comparing data transmitted from the code reading apparatus when the product was received, and data accumulated in the server transmitted from the code reading apparatus before receiving the product;

wherein the pattern that will convert is formed by a thermochromic marking element, in which pattern conversion occurs by a color of the pattern becoming a same color as a base material of the thermochromic marking element.

11. The logistics system according to claim 10, wherein the temperature deviation of the product is judged by data transmitted from the first, second and third code reading apparatuses.

\* \* \* \* \*